(12) United States Patent
Nihei et al.

(10) Patent No.: US 10,915,997 B2
(45) Date of Patent: Feb. 9, 2021

(54) IMAGING DEVICE AND IMAGING LENS

(71) Applicant: SONY CORPORATION, Tokyo (JP)

(72) Inventors: Yasuhide Nihei, Kanagawa (JP);
Masaki Tamura, Kanagawa (JP);
Kenshi Nabeta, Kumamoto (JP); Daigo Katsuragi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 243 days.

(21) Appl. No.: 15/106,352

(22) PCT Filed: Oct. 3, 2014

(86) PCT No.: PCT/JP2014/076523
§ 371 (c)(1),
(2) Date: Dec. 30, 2016

(87) PCT Pub. No.: WO2015/098226
PCT Pub. Date: Jul. 2, 2015

(65) Prior Publication Data
US 2017/0169549 A1 Jun. 15, 2017

(30) Foreign Application Priority Data

Dec. 26, 2013 (JP) .................................. 2013-268398

(51) Int. Cl.
*G06T 5/00* (2006.01)
*G02B 27/00* (2006.01)
*G02B 13/00* (2006.01)

(52) U.S. Cl.
CPC ............ *G06T 5/006* (2013.01); *G02B 13/004* (2013.01); *G02B 13/0045* (2013.01); *G02B 27/0025* (2013.01)

(58) Field of Classification Search
CPC .............. G02B 13/004; G02B 13/0045; G02B 13/0035; G02B 27/0025; G02B 9/12;
(Continued)

(56) References Cited

U.S. PATENT DOCUMENTS

2012/0229917 A1\* 9/2012 Huang ............... G02B 13/0045
359/713

FOREIGN PATENT DOCUMENTS

JP 2010-237407 A 10/2010
JP 2010-262270 A 11/2010
(Continued)

OTHER PUBLICATIONS

Sano et al. WO2013/187405 "Imaging Lens, Imaging Device, and Mobile Terminal", WIPO/PCT Dec. 19, 2013, English language machine translation.\*

*Primary Examiner* — Marin Pichler
(74) *Attorney, Agent, or Firm* — Chip Law Group

(57) ABSTRACT

An imaging device of the disclosure includes an imaging lens; an imaging element that converts an optical image formed on an image forming surface by the imaging lens, into an electric signal; and a computing device that corrects distortion aberration of an image picked up by the imaging element. The imaging lens includes, in order from object side, a front-group lens system having positive refractive power, and a rear-group lens system having negative refractive power, a lens surface on a closest side to the image of the rear-group lens system being concave on an image side near an optical axis and convex on the image side around a periphery, and the following conditional expression is satisfied:

$$5(\%) < OD_{Max} < 20(\%) \qquad (1)$$

where $OD_{Max}$ is a maximum value of distortion aberration within an imaging region of the imaging lens.

5 Claims, 6 Drawing Sheets

(58) Field of Classification Search
CPC . G02B 9/34; G02B 9/60; G06T 5/006; H04N 5/3572; H04N 5/357; H04N 9/045
USPC ....... 359/637, 713–716, 763, 765, 767, 771, 359/772, 773, 784
See application file for complete search history.

(56) References Cited

FOREIGN PATENT DOCUMENTS

| | | |
|---|---|---|
| JP | 2014-153574 A | 8/2014 |
| WO | 2013/187405 A | 12/2013 |
| WO | 2014/034432 A | 3/2014 |

\* cited by examiner

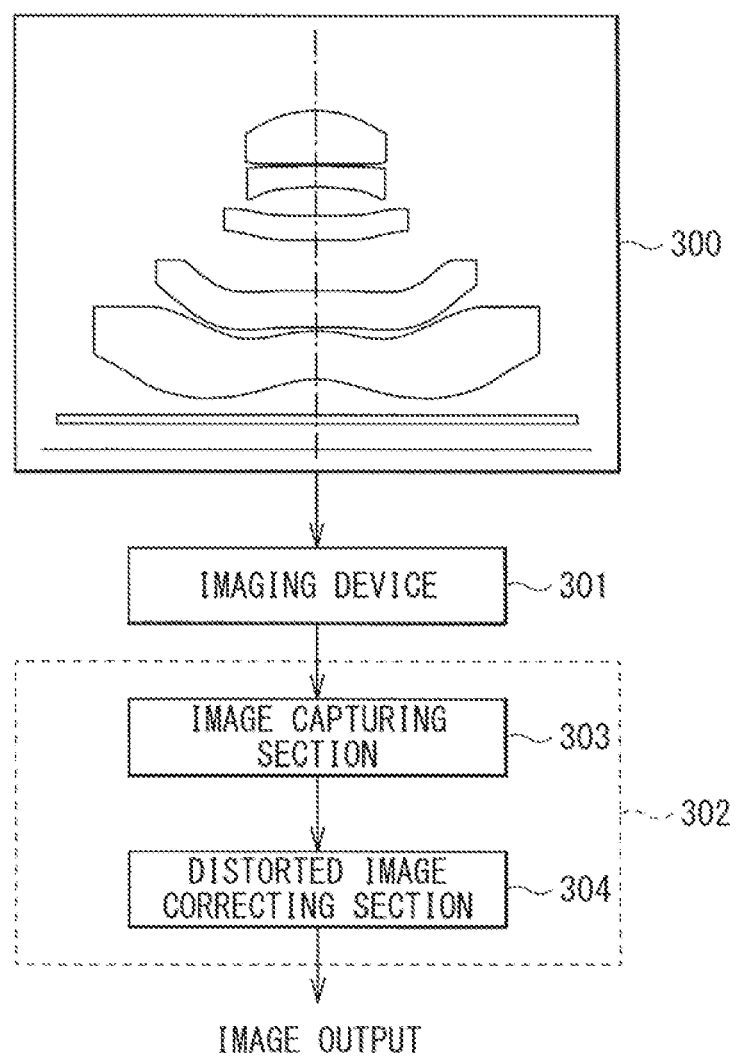

[FIG. 2]
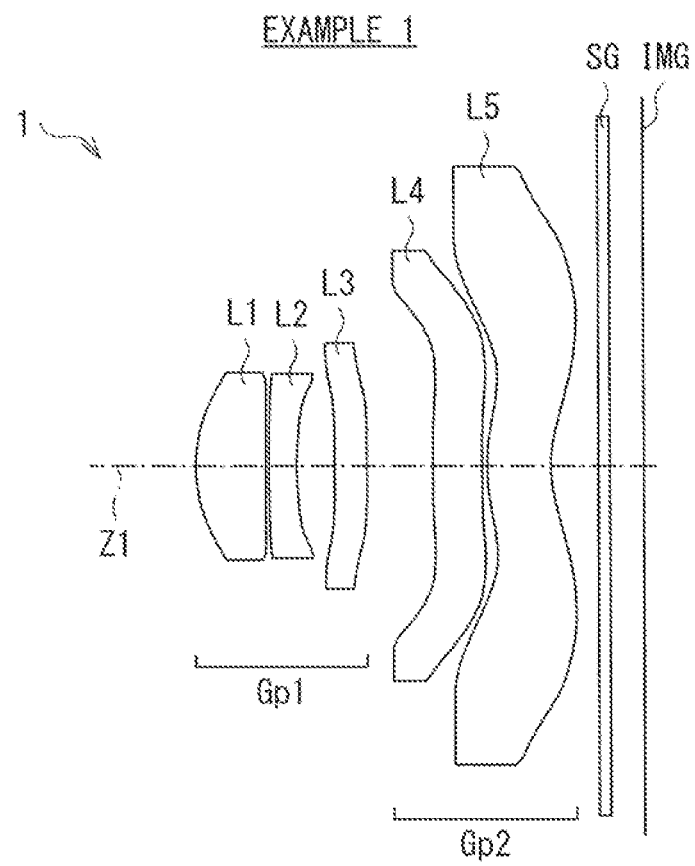
[FIG. 3]
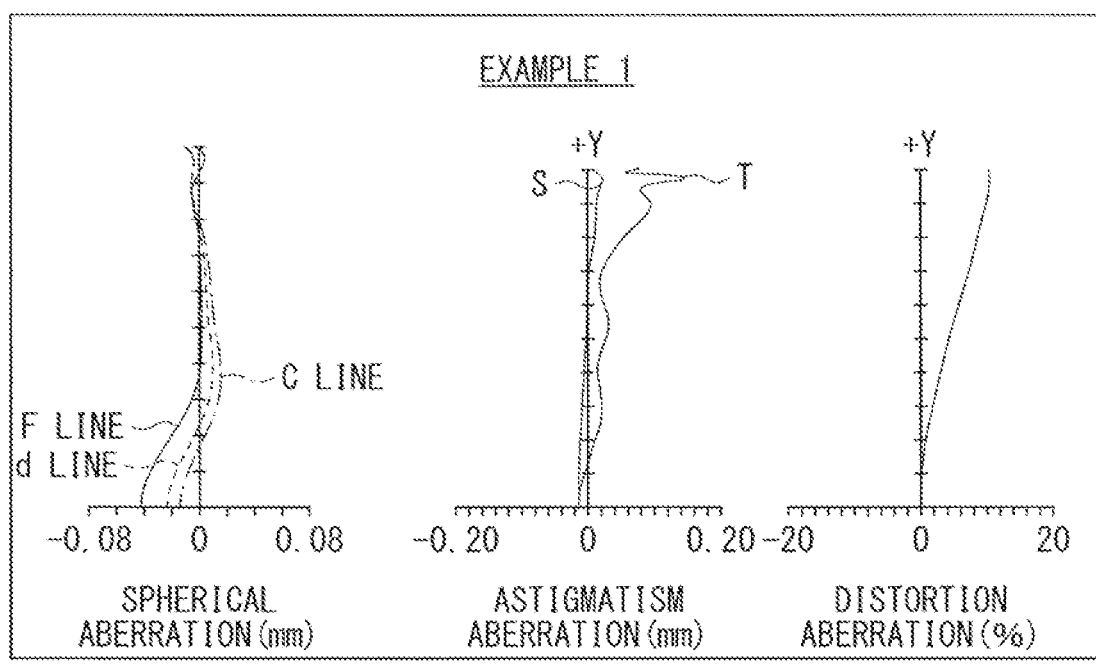

[FIG. 4]
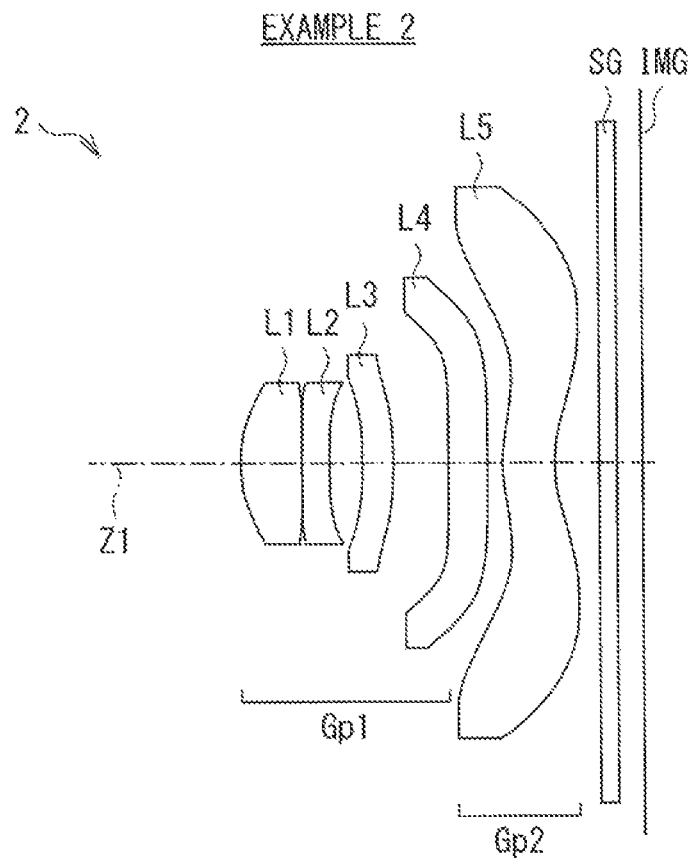
[FIG. 5]
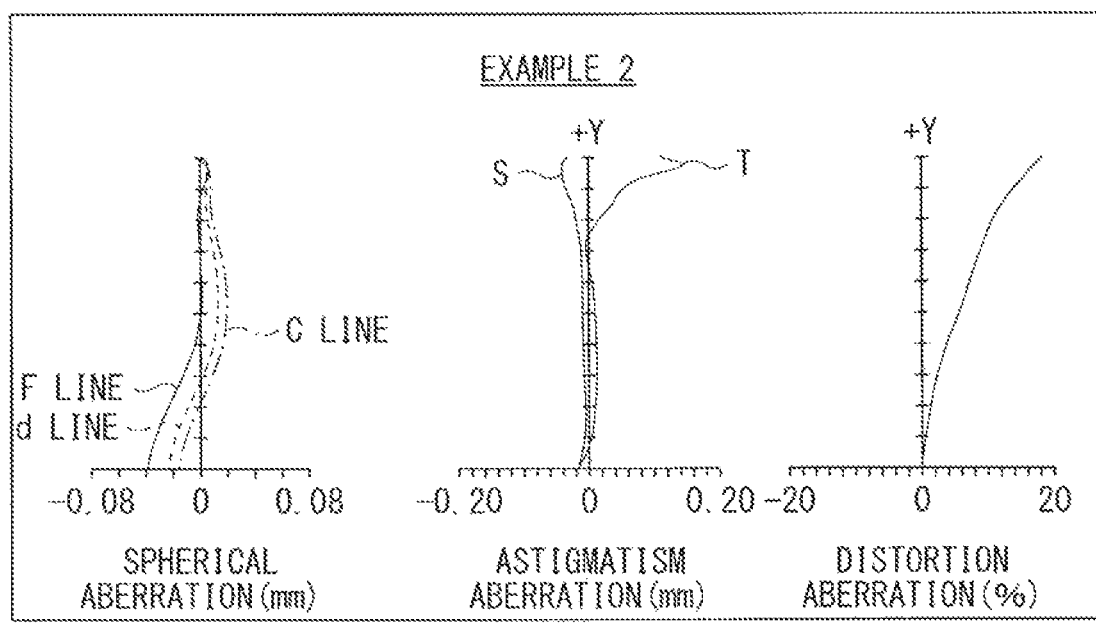

[FIG. 6]
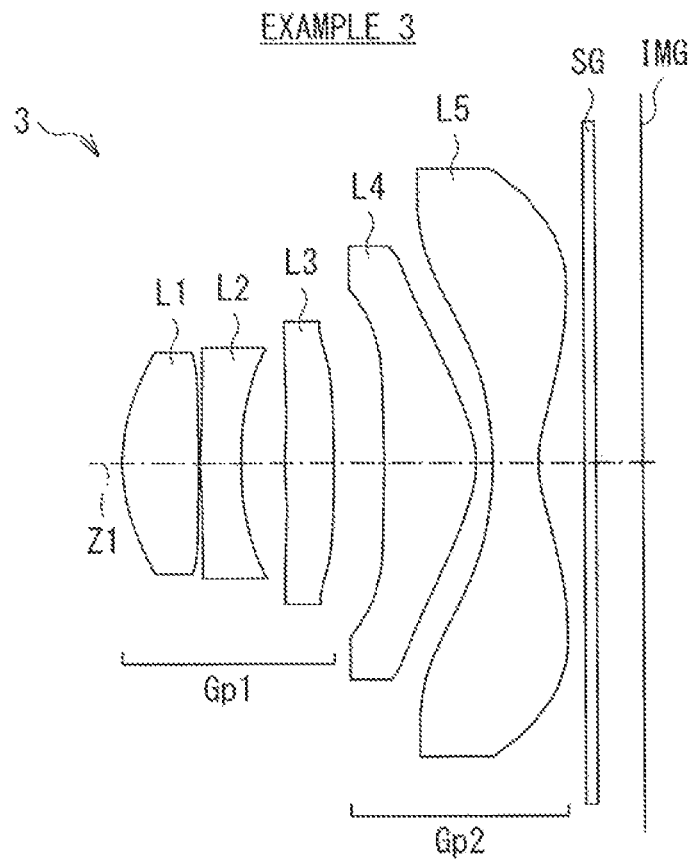
[FIG. 7]
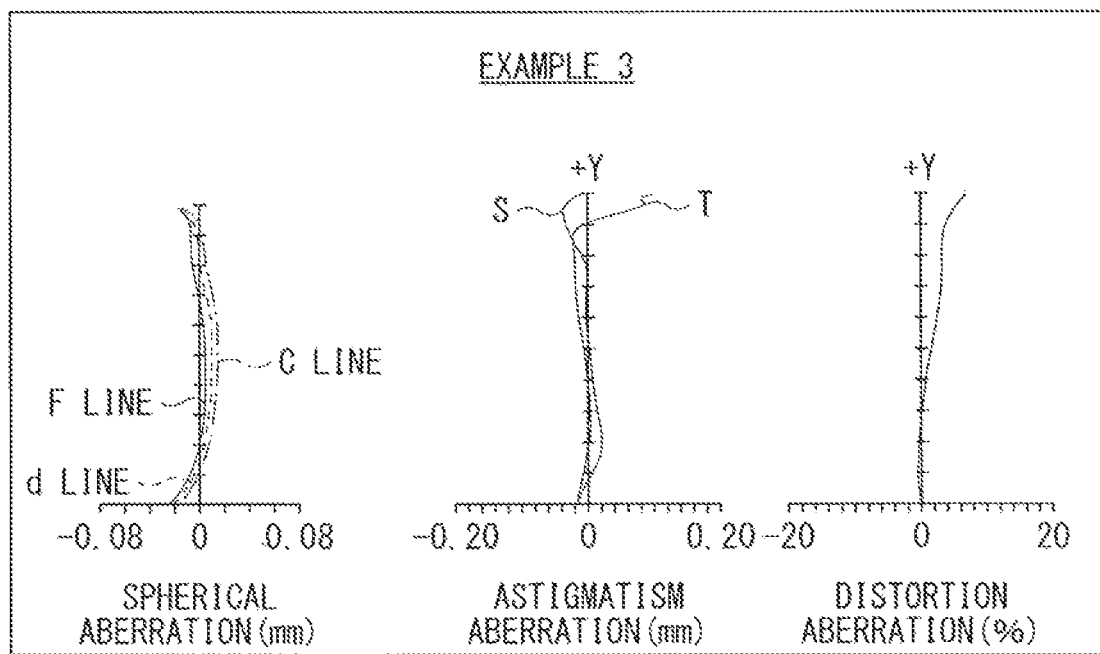

[ FIG. 8 ]
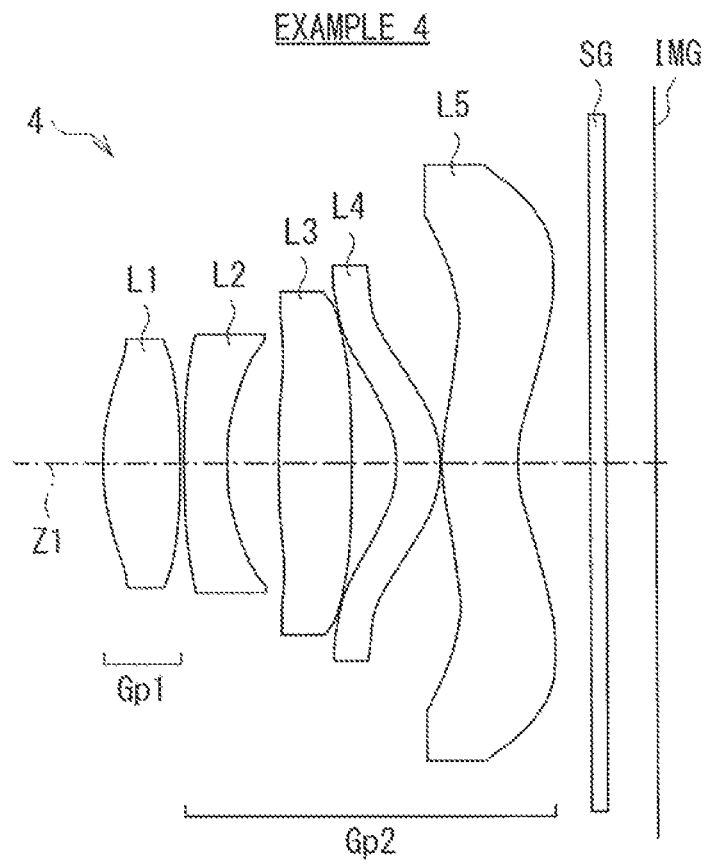
[ FIG. 9 ]
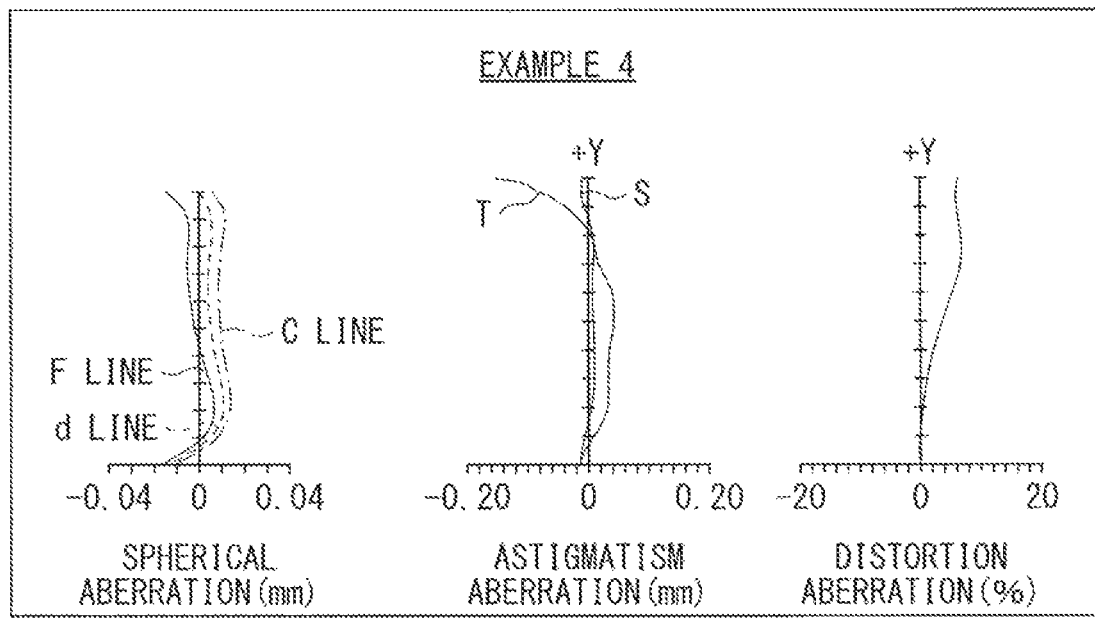

[FIG. 10]
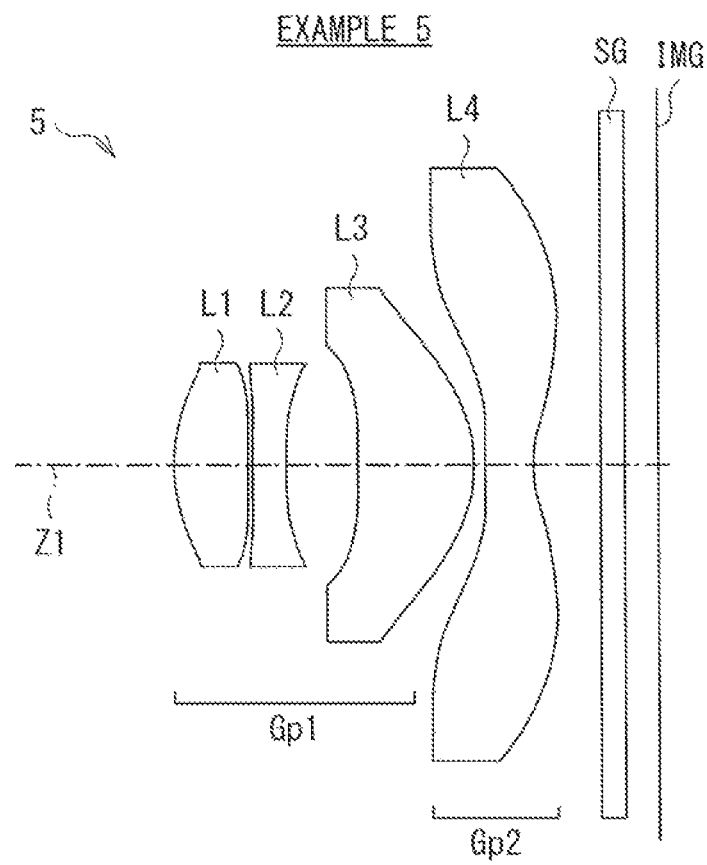
[FIG. 11]
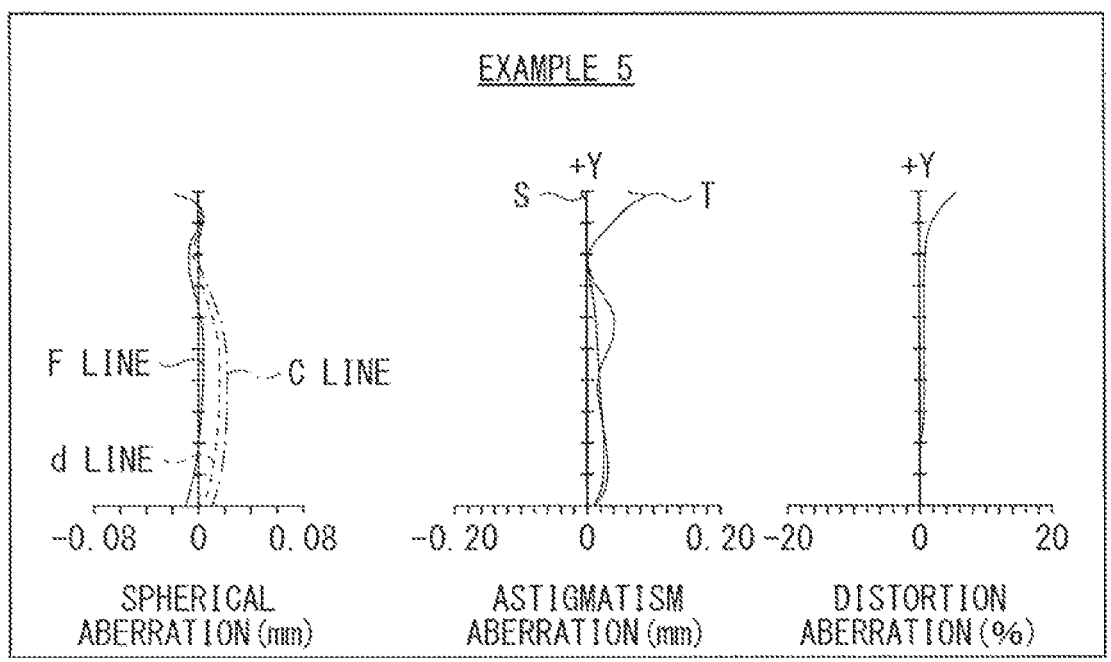

IMAGING DEVICE AND IMAGING LENS

CROSS REFERENCE TO RELATED APPLICATIONS

This application is a U.S. National Phase of International Patent Application No. PCT/JP2014/076523 filed on Oct. 3, 2014, which claims priority benefit of Japanese Patent Application No. JP 2013-268398 filed in the Japan Patent Office on Dec. 26, 2013. Each of the above-referenced applications is hereby incorporated herein by reference in its entirety.

TECHNICAL FIELD

The disclosure relates to an imaging device using an imaging lens. More specifically, the disclosure relates to an imaging device that provides high image quality and has small thickness, and is suitable for a small imaging device using a solid-state imaging element such as a CMOS, for example, a mobile phone with a camera, and to an imaging lens used in such an imaging device.

BACKGROUND ART

Mobile phones with cameras and digital still cameras are known, using solid-state imaging element such as a charge coupled device (CCD) and a complementary metal-oxide semiconductor (CMOS). Such an imaging device is demanded to have smaller size and smaller thickness, and a lens mounted for imaging is also demanded to have small size and small total length.

In addition, in recent years, the imaging element is increased in pixels also in an imaging device such as a mobile phone with a camera, and a mobile phone mounted with high-pixel imaging elements of ten million pixels or more is popular. Accordingly, an imaging lens to be mounted is also demanded to have high lens performance matched with the high-pixel solid-state imaging element.

In contrast, such an imaging device is typically mounted with a single focus lens because of limitations of its size, and an imaging lens having a relatively wide angle of view is demanded. For example, imaging devices disclosed in PTL 1 and PTL 2 are known as such an imaging device that includes a small and thin imaging lens having high performance and a wide angle.

CITATION LIST

Patent Literature

PTL 1: Japanese Unexamined Patent Application Publication No. 2010-237407
PTL 2: Japanese Unexamined Patent Application Publication No. 2010-262270

SUMMARY

In PTLs 1 and 2 mentioned above, description is given of an imaging device including an imaging lens that is configured of five lenses matched with an existing high-pixel imaging element. In PTLs 1 and 2, a lens system having positive refractive power is disposed as a front group and a lens system having negative refractive power is disposed as a rear group to regulate a total optical length, and various aberrations are corrected with good balance by an aspherical lens group disposed in the rear group, thereby achieving a small, thin, and wide angle imaging device that also secures high optical performance.

In recent years, an imaging lens to be mounted on an electronic apparatus having an imaging device, represented by a smartphone and a tablet terminal, is demanded to have a smaller size and a smaller thickness, and a total length smaller than that of the above-described imaging lens is demanded. However, if the total length of the imaging lens is further reduced in order to achieve further reduction of the total length in the imaging device disclosed in the above-described patent literatures, distortion aberration, comatic aberration, and field curvature of off-axis aberrations are not corrected sufficiently, which makes it difficult to secure necessary optical performance. In addition, in such an imaging lens for an imaging device, in terms of reduction in thicknesses of respective lenses configuring a lens system, a lens having a center thickness and an edge thickness close to process limit is often employed at this time. Thus, it is extremely difficult to achieve further reduction of total length of the imaging device while securing mass productivity.

Accordingly, it is desirable to provide an imaging lens making it possible to achieve total length reduction. Further, it is desirable to provide an imaging device that corrects distortion aberration caused by the imaging lens reduced in total length, and makes it possible to achieve size reduction and thickness reduction of the entire device while securing favorable optical performance matched with a high-pixel imaging element.

An imaging device according to an embodiment of the disclosure includes: an imaging lens; an imaging element that converts an optical image formed on an image forming surface by the imaging lens, into an electric signal; and a computing device that corrects distortion aberration of an image picked up by the imaging element. The imaging lens includes, in order from object side, a front-group lens system having positive refractive power, and a rear-group lens system having negative refractive power, and a lens surface on a closest side to the image of the rear-group lens system is concave on an image side near an optical axis and convex on the image side in a periphery, and the following conditional expression is satisfied:

$$5(\%) < OD_{Max} < 20(\%) \tag{1}$$

where $OD_{Max}$ is a maximum value of distortion aberration within an imaging region of the imaging lens.

An imaging lens according to an embodiment of the disclosure includes, in order from object side, a front-group lens system having positive refractive power; and a rear-group lens system having negative refractive power, and a lens surface on a closest side to the image of the rear-group lens system is concave on an image side near an optical axis and convex on the image side in a periphery, and the following conditional expression is satisfied:

$$5(\%) < OD_{Max} < 20(\%) \tag{1}$$

where $OD_{Max}$ is a maximum value of distortion aberration within an imaging region of the imaging lens.

An imaging lens according to the embodiment of the disclosure may be preferably combined and used with an imaging device provided with a computing device that corrects distortion aberration of an image picked up by an imaging element.

In the imaging lens according to the embodiment of the disclosure, power arrangement and the lens shape of the lens system may be optimized, and distortion aberration within a predetermined range that allows for total length reduction may be intentionally generated while the other aberrations may be corrected with good balance.

In addition, in the imaging device according to the embodiment of the disclosure, the distortion aberration caused by the imaging lens reduced in total length may be corrected by the computing device.

According to the imaging lens of the embodiment of the disclosure, the power arrangement and the lens shape of the lens system are optimized, and the distortion aberration within the predetermined range are intentionally generated while the other aberrations are corrected with good balance. This makes it possible to achieve total length reduction.

Also, according to the imaging device of the embodiment of the disclosure, the distortion aberration caused by the imaging lens reduced in total length is corrected by the computing device. This makes it possible to achieve size reduction and thickness reduction of the entire device while securing favorable optical performance matched with a high-pixel imaging element.

Furthermore, effects described here are non-limiting. Effects achieved by the technology may be one or more of effects described in the present disclosure.

BRIEF DESCRIPTION OF DRAWINGS

FIG. 1 is a block diagram illustrating a configuration example of an imaging device according to an embodiment of the disclosure.

FIG. 2 is a lens sectional diagram illustrating a first configuration example of an imaging lens according to an embodiment of the disclosure.

FIG. 3 is an aberration diagram illustrating various aberrations in Numerical example 1 in which specific numerical values are applied to the imaging lens illustrated in FIG. 2.

FIG. 4 is a lens sectional diagram illustrating a second configuration example of the imaging lens.

FIG. 5 is an aberration diagram illustrating various aberrations in Numerical example 2 in which specific numerical values are applied to the imaging lens illustrated in FIG. 4.

FIG. 6 is a lens sectional diagram illustrating a third configuration example of the imaging lens.

FIG. 7 is an aberration diagram illustrating various aberrations in Numerical example 3 in which specific numerical values are applied to the imaging lens illustrated in FIG. 6.

FIG. 8 is a lens sectional diagram illustrating a fourth configuration example of the imaging lens.

FIG. 9 is an aberration diagram illustrating various aberrations in Numerical example 4 in which specific numerical values are applied to the imaging lens illustrated in FIG. 8.

FIG. 10 is a lens sectional diagram illustrating a fifth configuration example of the imaging lens.

FIG. 11 is an aberration diagram illustrating various aberrations in Numerical example 5 in which specific numerical values are applied to the imaging lens illustrated in FIG. 10.

DESCRIPTION OF EMBODIMENTS

Some embodiments of the disclosure are described in detail below with reference to drawings. Moreover, the description is given in the following order.
1. Basic configuration of imaging device and imaging lens
2. Considerations
3. Numerical examples of lens
4. Other embodiments 1. Basic Configuration of Imaging Device and Imaging Lens FIG. 1 illustrates a configuration example of an imaging device according to an embodiment of the disclosure. As illustrated in FIG. 1, the imaging device according to the present embodiment includes an imaging lens 300, an imaging element 301, and a computing device 302. The imaging element 301 converts an optical image that is formed on an image forming surface IMG by the imaging lens 300, into an electric signal, and may be configured of a solid-state imaging element such as a CCD and a CMOS. The image forming surface IMG of the imaging lens 300 is so disposed as to be coincident with an imaging surface of the imaging element 301.

The computing device 302 acquires an image picked up by the imaging element 301 to perform various kinds of image processing on the image. The computing device 302 includes an image capturing section 303 and a distorted image correcting section 304. The image capturing section 303 acquires the image picked up by the imaging element 301, and the distorted image correcting section 304 performs image processing of correcting distortion aberration on the acquired image and outputs the processed image.

Moreover, the imaging device according to the present embodiment is widely applicable as a camera section, etc. of a digital input-output apparatus such as a mobile phone with a camera, a personal digital assistant (PDA) incorporated with a camera, and a tablet terminal. In addition, the imaging device according to the present embodiment is applicable to, for example, a digital still camera and a digital video camera.

FIG. 2 illustrates a first configuration example (an imaging lens 1) of the imaging lens 300 according to the present embodiment. FIG. 4 illustrates a second configuration example (an imaging lens 2) of the imaging lens 300. FIG. 6 illustrates a third configuration example (an imaging lens 3) of the imaging lens 300. FIG. 8 illustrates a fourth configuration example (an imaging lens 4) of the imaging lens 300. FIG. 10 illustrates a fifth configuration example (an imaging lens 5) of the imaging lens 300. Moreover, numerical examples to which specific numerical values are applied to the respective configuration examples are described later.

In FIG. 2 and other figures, a reference symbol IMG refers to an image forming surface, and a reference symbol Z1 refers to an optical axis. A seal glass SG for protection of the imaging element and an optical member such as various kinds of optical filters may be provided between the imaging lens 300 (each of the imaging lenses 1 to 5) and the image forming surface IMG.

The configuration of the imaging lens 300 according to the present embodiment is described below in appropriate association with the configuration examples illustrated in FIG. 2 and other figures; however, the technology of the disclosure is not limited to the illustrated configuration examples.

As illustrated in the configuration examples of FIG. 2 and other figures, the imaging lens 300 includes a front-group lens system Gp1 and a rear-group lens system Gp2 in order from object side along the optical axis Z1. The front-group lens system Gp1 has positive refractive power, and the rear-group lens system Gp2 has negative refractive power. In the rear-group lens system Gp2, a lens surface on a closest side to the image is concave on an image side near the optical axis and convex on the image side around a periphery.

The imaging lens 300 satisfies the following conditional expression.

$$5(\%) < OD_{Max} < 20(\%) \quad (1)$$

where $OD_{Max}$ is a maximum value of distortion aberration in an imaging region of the imaging lens 300.

In addition, the imaging lens 300 according to the present embodiment may desirably further satisfy the following predetermined conditional expression or other expressions.

2. Considerations

Next, considerations on the imaging device and the imaging lens 300 according to the present embodiment are described. A desirable configuration of the imaging lens 300 according to the present embodiment is also described.

Moreover, the effects described in the present specification are illustrative and non-limiting. Effects achieved by the technology may be effects other than those described in the present specification.

According to the imaging lens 300 of the present embodiment, power arrangement and the lens shape of the lens system are optimized, and distortion aberration within a predetermined correctable range (the conditional expression (1)) is intentionally generated by the computing device 302 while other aberrations are corrected with good balance. This makes it possible to achieve reduction in total length of the imaging lens 300.

In addition, according to the imaging device of the present embodiment, the distortion aberration caused by the imaging lens 300 reduced in total length is corrected by the computing device 302. This allows the imaging device to have favorable optical performance matched with the high-pixel imaging element 301 and achieves size reduction and thickness reduction and a wide angle, as the entire device.

The imaging lens 300 is in power arrangement of positive and negative in order from the object side, and the lens surface on the closest side to the image is concave on the image side near the optical axis and convex on the image side around the periphery. This corrects the various aberrations such as comatic aberration and field curvature of off-axis aberrations with good balance while reducing the optical total length, thereby achieving the wide-angle small imaging lens having favorable optical performance.

In addition, further reduction of the total length of the imaging lens 300 is achieved by satisfying the above-described conditional expression (1). The above-described conditional expression (1) defines the maximum value of the distortion aberration within the imaging region of the imaging lens 300, and regulates a generation amount of positive distortion aberration.

In an optical configuration of telephoto type in which a lens system having positive refractive power is disposed as the front group and a lens system having negative refractive power is disposed as the rear group, positive distortion aberration occurred in the negative lens system of the rear group is dominant, and the reduction in total length of the imaging lens 300 is difficult because of correction of the positive distortion aberration. Thus, appropriately accepting the regulation amount and properly performing the image correction by the computing device 302 in the subsequent stage make it possible to achieve further reduction in total length of the imaging lens 300.

When the maximum value of the distortion aberration is beyond the lower limit of the conditional expression (1), the distortion aberration correction of the imaging lens 300 becomes necessary. This makes it difficult to achieve total length reduction necessary for the imaging device according to the present embodiment. In contrast, when the maximum value of the distortion aberration is beyond the upper limit of the conditional expression (1), the distortion aberration amount becomes excessively large. This is advantageous to the total length reduction, but the image correction amount of the computing device 302 in the subsequent stage becomes proportionally excessively large, which makes it difficult to exert resolution performance, in the center of the image, necessary for the imaging device. Also, it becomes difficult to correct other off-axis aberrations with good balance.

Further, when the imaging lens 300 satisfies the following conditional expression (2), it is possible to achieve further reduction in optical total length necessary for the imaging device according to the present embodiment.

$$0.55 < L_{inf}/D < 0.80 \quad (2)$$

where $L_{inf}$ is a distance on the optical axis between the lens surface on the closest side to the object and the image forming surface IMG when the imaging lens 300 is focused on infinity (where a distance between the lens surface on the closest side to the image of the rear-group lens system Gp2 and the image forming surface IMG is an air conversion length), and D is a diagonal length of an effective imaging region.

The conditional expression (2) defines a ratio of the distance on the optical axis between the lens surface of the imaging lens 300 on most infinite object side and the imaging element 301 to the diagonal length of the effective imaging region of the imaging element 301, and regulates a range of the total length of the lens with respect to the imaging element 301. When the value of the ratio is beyond the upper limit of the conditional expression (2), it becomes difficult to achieve total length reduction necessary for the imaging device according to the present embodiment. In contrast, when the value of the ratio is beyond the lower limit of the conditional expression (2), it is advantageous to the total length reduction, but comatic aberration and field curvature of off-axis aberrations are not corrected sufficiently. This makes it difficult to secure high optical performance necessary for the high-pixel imaging element 301.

In the present embodiment, each of the front-group lens system Gp1 and the rear-group lens system Gp2 may preferably include one or a plurality of lenses. The entire lens system including the front-group lens system Gp1 and the rear-group lens system Gp2 may preferably include a first lens L1 having positive refractive power and a second lens L2 having negative refractive power in order from the object side. Such a configuration makes it possible to achieve both optical total length reduction and wide angle. An optical configuration of a retro-focus type in which a lens system having negative refractive power is disposed as the front group and a lens system having positive refractive power is disposed as the rear group is common in a wide-angle lens. With the configuration of the retro-focus type, however, it is difficult to achieve total length reduction necessary for the imaging device according to the present embodiment. In contrast, the imaging lens 300 is configured to at least include the first lens L1 having positive refractive power and the second lens L2 having negative refractive power that are arranged in order from the object side, and the lens surface on the closest side to the image in the entire lens system is concave on the image side near the optical axis and convex on the image side around the periphery. This makes it possible to achieve both optical total length reduction and a wide angle.

Further, setting the power arrangement of the imaging lens 300 to satisfy one or more of the following conditional expressions (3) to (5) makes it possible to achieve optical total length reduction and secure favorable optical performance necessary for the imaging device according to the present embodiment.

$$f_{ra} < 0 \quad (3)$$

where $f_{ra}$ is a synthetic focal length of all of second and following lenses in the entire lens system including the front-group lens system Gp1 and the rear-group lens system Gp2.

$$f_{rb} < 0 \quad (4)$$

where $f_{rb}$ is a synthetic focal length of two lenses from the image side in the entire lens system including the front-group lens system Gp1 and the rear-group lens system Gp2.

$$f_{rc} < 0 \quad (5)$$

where $f_{rc}$ is a focal length of the lens on the closest side to the image in the entire lens system including the front-group lens system Gp1 and the rear-group lens system Gp2.

The conditional expression (3) defines the synthetic focal length of all of second and following lenses from the object side, configuring the imaging lens 300. For example, in the imaging lens 1 according to the first configuration example illustrated in FIG. 2, $f_{ra}$ may be a synthetic focal length of the second lens L2 to the fifth lens L5.

The conditional expression (4) defines the synthetic focal length of two lenses from the image side, configuring the imaging lens 300. For example, in the imaging lens 1 according to the first configuration example illustrated in FIG. 2, $f_{rb}$ may be a synthetic focal length of the fourth lens L4 and the fifth lens L5.

The conditional expression (5) defines the focal length of the lens on the closest side to the image, configuring the imaging lens 300, and defines the configuration of the rear-group lens system Gp2. For example, in the imaging lens 1 according to the first configuration example illustrated in FIG. 2, $f_{rc}$ may be a focal length of the fifth lens L5.

A lens configuration that satisfies one or more conditions of the conditional expressions (3) to (5) is employed and the positive distortion aberration is set within a specified range of the conditional expression (1). This makes it possible to reduce the optical total length and secure favorable optical performance.

Moreover, to reduce the optical total length and secure favorable optical performance, the rear-group lens system Gp2 may desirably include a configuration satisfying both the conditional expression (3) and the conditional expression (4).

Further, in the imaging lens 300, the entire lens system including the front-group lens system Gp1 and the rear-group lens system Gp2 may be configured of at least four lenses. More desirable would be a lens system configured of five or more lenses. Employing the configuration of four or five or more lenses allows for well balanced correction of other aberrations excluding the distortion aberration.

EXAMPLES

3. Numerical Examples of Lens

Next, specific numerical examples of an imaging lens according to the present embodiment are described. Here, descriptions are given of numerical examples in which specific numerical values are applied to the imaging lenses 1, 2, 3, 4, and 5 in the respective configuration examples illustrated in FIG. 2, FIG. 4, FIG. 6, FIG. 8, and FIG. 10.

Moreover, symbols etc. in tables and the description below represent the following. "Si" refers to the number of an i-th surface counted from the most object side. "Ri" refers to a value (mm) of a paraxial curvature radius of the i-th surface. "di" refers to a value (mm) of a spacing on the optical axis between the i-th surface and the (i+1)th surface. "ni" refers to a value of a refractive index of a d-line (having a wavelength of 587.6 nm) of a material of an optical member that has the i-th surface. "vi" refers to a value of an Abbe number, with respect to the d-line, of the material of the optical member that has the i-th surface. A value of "D0" in "Ri" indicates that the relevant surface is a planar surface or an aperture surface (an aperture stop). A surface with "STO" in "Si" indicates that the relevant surface is the aperture stop. "f" refers to a total focal length of the lens system. "F" refers to an F number. "2ω" refers to a full angle of view before the distortion aberration is corrected by the computing device 302.

Some lenses used in the respective numerical examples have an aspherical lens surface. A surface with "ASP" in "Si" indicates that the relevant surface is aspherical. When a depth of the aspherical surface is denoted by Z and a height thereof from the optical axis Z1 is denoted by Y, the shape of the aspherical surface is defined by the following expression. Moreover, R refers to a curvature radius, K refers to a conic constant, and A3 to A20 refer to third to twentieth order aspherical surface coefficients, respectively. Moreover, in the respective tables showing the aspherical surface coefficients described later, "E-i" represents an exponential expression having 10 as a base, i.e., "10$^{-i}$". For example, "0.12345E-05" represents "0.12345×10$^{-5}$".

$$Z = \frac{\frac{Y^2}{R}}{1 + \sqrt{1 - (1+K)\left(\frac{Y}{R}\right)^2}} + A_3 Y^3 + A_4 Y^4 +$$

$$A_5 Y^5 + A_6 Y^6 + A_7 Y^7 + A_8 Y^8 + A_9 Y^9 + A_{10} Y^{10} +$$

$$A_{11} Y^{11} + A_{12} Y^{12} + A_{13} Y^{13} + A_{14} Y^{14} + A_{15} Y^{15} +$$

$$A_{16} Y^{16} + A_{17} Y^{17} + A_{18} Y^{18} + A_{19} Y^{19} + A_{20} Y^{20}$$

[Expression 1]

Configuration Common to Numerical Examples

Each of the imaging lenses 1, 2, 3, 4, and 5 to which the respective numerical examples below are applied has a configuration that satisfies the above-described basic configuration of the lens. Each of the imaging lenses 1, 2, 3, 4, and 5 is substantially configured of two lens groups, that are the front-group lens system Gp1 having positive refractive power and the rear-group lens system Gp2 having negative refractive power arranged in order from the object side. In the rear-group lens system Gp2, a lens surface on the closest side to the image is concave on the image side near the optical axis and convex on the image side around the periphery.

Numerical Example 1

The imaging lens 1 illustrated in FIG. 2 is a lens system substantially configured of the first lens L1 to the fifth lens L5. The front-group lens system Gp1 is substantially configured of the first lens L1 to the third lens L3. The rear-group lens system Gp2 is configured of the fourth lens L4 and the fifth lens L5. The lens surface of the fifth lens L5 on the image side is concave on the image side near the optical axis, and convex on the image side around the periphery. The seal glass SG is disposed between the fifth lens L5 and the image forming surface IMG. The aperture stop is disposed in the vicinity of the front side of the first lens L1.

Table 1 shows lens data of Numerical example 1 to which specific numerical values are applied to the imaging lens 1, together with values of the focal length f of the entire lens system, the F number, and the full angle of view 2ω. In the imaging lens 1, both surfaces of each of the first lens L1 to the fifth lens L5 are aspherical. Table 2 shows values of the aspherical coefficients A3 to A20 of those aspherical surfaces, together with values of conic constant K.

TABLE 1

F = 2.05
f = 4.24
2ω = 79.5°
Example 1

| Lens Group | Si | Ri | Di | ni | vi |
|---|---|---|---|---|---|
| Gp1 | 0(STO) | ∞ | −0.34 | | |
| | 1(ASP) | 1.640 | 0.79 | 1.534 | 55.6 |
| | 2(ASP) | 8.017 | 0.04 | | |
| | 3(ASP) | 7.817 | 0.3 | 1.651 | 21.5 |
| | 4(ASP) | 3.468 | 0.43 | | |
| | 5(ASP) | 94.140 | 0.37 | 1.534 | 55.6 |
| | 6(ASP) | −20.431 | 0.75 | | |
| Gp2 | 7(ASP) | 109.970 | 0.54 | 1.651 | 21.5 |
| | 8(ASP) | 11.359 | 0.05 | | |
| | 9(ASP) | 1.659 | 0.73 | 1.534 | 55.6 |
| | 10 (ASP) | 1.457 | 0.54 | | |
| SG | 11 | ∞ | 0.11 | 1.517 | 64.2 |
| | 12 | ∞ | 0.39 | | |
| IMG | 13 | ∞ | | | |

TABLE 2

Example 1

| | S1 | S2 | S3 | S4 | S5 |
|---|---|---|---|---|---|
| K | −6.0889 | 0 | −13.3394 | 0 | 0 |
| A3 | 0 | 0 | 0 | 0 | 0 |
| A4 | 1.6008E−01 | −2.2425E−01 | −2.1870E−01 | −3.0142E−02 | −1.1091E−01 |
| A5 | 0 | 0 | 0 | 0 | 0 |
| A6 | −7.7377E−02 | 4.7878E−01 | 5.5651E−01 | 1.8487E−01 | 6.6187E−02 |
| A7 | 0 | 0 | 0 | 0 | 0 |
| A8 | 5.7118E−03 | −6.3685E−01 | −7.1566E−01 | −1.7724E−01 | −9.6653E−02 |
| A9 | 0 | 0 | 0 | 0 | 0 |
| A10 | 3.9011E−02 | 5.1354E−01 | 5.7817E−01 | 1.1952E−01 | 9.3905E−02 |
| A11 | 0 | 0 | 0 | 0 | 0 |
| A12 | −2.4274E−02 | −2.7310E−01 | −3.0865E−01 | −1.1195E−02 | −2.5015E−02 |
| A13 | 0 | 0 | 0 | 0 | 0 |
| A14 | 0 | 6.7272E−02 | 8.1275E−02 | −4.5508E−02 | −1.9675E−03 |
| A15 | 0 | 0 | 0 | 0 | 0 |
| A16 | 0 | 0 | 0 | 2.9180E−02 | −2.8022E−03 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |

| | S6 | S7 | S8 | S9 | S10 |
|---|---|---|---|---|---|
| K | 0 | −0.7671 | −17.6788 | −0.7173 | −2.6017 |
| A3 | 0 | 0 | 0 | 0 | 0 |
| A4 | −7.4997E−02 | 1.0174E−01 | 3.4005E−02 | −2.33E−01 | −1.10E−01 |
| A5 | 0 | 0 | 0 | 0 | 0 |
| A6 | −1.7257E−02 | −1.2907E−01 | −5.6710E−02 | 5.16E−02 | 3.31E−02 |
| A7 | 0 | 0 | 0 | 0 | 0 |
| A8 | 4.9515E−02 | 6.3705E−02 | 2.2679E−02 | −6.43E−03 | −6.47E−03 |
| A9 | 0 | 0 | 0 | 0 | 0 |
| A10 | −5.0166E−02 | −1.9559E−02 | −5.8076E−03 | 7.60E−04 | 8.73E−04 |
| A11 | 0 | 0 | 0 | 0 | 0 |
| A12 | 3.9553E−02 | 2.7309E−03 | 9.8843E−04 | −1.14E−04 | −8.48E−05 |
| A13 | 0 | 0 | 0 | 0 | 0 |
| A14 | −1.2798E−02 | 4.6083E−05 | −9.5774E−05 | 1.11E−05 | 5.23E−06 |
| A15 | 0 | 0 | 0 | 0 | 0 |
| A16 | 9.1138E−04 | −3.1414E−05 | 3.9182E−06 | −4.41E−07 | −1.43E−07 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |

Various aberrations in Numerical example 1 mentioned above are illustrated in FIG. 3. FIG. 3 illustrates, as the various aberrations, spherical aberration, astigmatism aberration (field curvature), and distortion (distortion aberration). In the respective aberration diagrams, aberration with the d-line (587.6 nm) as a reference wavelength is illustrated. In the spherical aberration diagram, aberration with respect to an F-line (486.1 nm) and a C-line (656.3 nm) are also illustrated. In the aberration diagram of the field curvature, "S" is a value of the aberration on a sagittal surface, and "T" is a value of the aberration on a tangential surface. The same applies to aberration diagrams in the following other numerical examples.

As apparent from the above-described aberration diagrams, the distortion aberration is within the range of the above-described conditional expression (1), the other various aberrations are favorably corrected, and optimal optical performance is exerted.

Numerical Example 2

The imaging lens 2 illustrated in FIG. 4 is a lens system substantially configured of the first lens L1 to the fifth lens L5. The front-group lens system Gp1 is substantially configured of the first lens L1 to the fourth lens L4. The rear-group lens system Gp2 is configured of the fifth lens L5. The lens surface of the fifth lens L5 on the image side is concave on the image side near the optical axis, and convex on the image side around the periphery. The seal glass SG is disposed between the fifth lens L5 and the image forming surface IMG. The aperture stop is disposed in the vicinity of the front side of the first lens L1.

Table 3 shows lens data of Numerical example 2 to which specific numerical values are applied to the imaging lens 2, together with values of the focal length f of the entire lens system, the F number, and the full angle of view $2\omega$. In the imaging lens 2, both surfaces of each of the first lens L1 to the fifth lens L5 are aspherical. Table 4 shows values of the aspherical coefficients A3 to A20 of those aspherical surfaces, together with values of conic constant K.

TABLE 3

F = 2.25
f = 3.93
$2\omega$ = 80.0°
Example 2

| Lens Group | Si | Ri | Di | ni | vi |
|---|---|---|---|---|---|
| Gp1 | 0(STO) | ∞ | −0.28 | | |
| | 1(ASP) | 1.473 | 0.69 | 1.534 | 55.6 |
| | 2(ASP) | 18.359 | 0.02 | | |
| | 3(ASP) | 18.043 | 0.3 | 1.651 | 21.5 |
| | 4(ASP) | 3.918 | 0.39 | | |
| | 5(ASP) | −4.737 | 0.36 | 1.534 | 55.6 |
| | 6(ASP) | −4.776 | 0.63 | | |
| | 7(ASP) | 68.141 | 0.45 | 1.651 | 21.5 |
| | 8(ASP) | 26.854 | 0.20 | | |
| Gp2 | 9(ASP) | 1.782 | 0.60 | 1.534 | 55.6 |
| | 10 (ASP) | 1.591 | 0.52 | | |
| SG | 11 | ∞ | 0.21 | 1.517 | 64.2 |
| | 12 | ∞ | 0.29 | | |
| IMG | 13 | ∞ | | | |

TABLE 4

Example 2

| | S1 | S2 | S3 | S4 | S5 |
|---|---|---|---|---|---|
| K | 0.1628 | 10 | −10 | −20 | −10 |
| A3 | 0 | 0 | 0 | 0 | 0 |
| A4 | −1.6831E−02 | −3.7466E−02 | −5.3163E−03 | 9.9062E−02 | −8.1348E−02 |
| A5 | 0 | 0 | 0 | 0 | 0 |
| A6 | 3.1178E−02 | −2.5688E−02 | 4.8417E−02 | 4.0707E−02 | −1.0129E−01 |
| A7 | 0 | 0 | 0 | 0 | 0 |
| A8 | −1.0293E−01 | 8.3686E−02 | −1.4406E−02 | −5.2961E−02 | 2.5490E−01 |
| A9 | 0 | 0 | 0 | 0 | 0 |
| A10 | 1.2616E−01 | −2.5046E−01 | −8.3816E−02 | 2.4859E−01 | −3.2062E−01 |
| A11 | 0 | 0 | 0 | 0 | 0 |
| A12 | −8.4563E−02 | 1.8593E−01 | 5.9956E−02 | −2.8866E−01 | 1.6582E−01 |
| A13 | 0 | 0 | 0 | 0 | 0 |
| A14 | 0 | −5.2068E−02 | 9.8946E−03 | 1.2652E−01 | 1.2170E−01 |
| A15 | 0 | 0 | 0 | 0 | 0 |
| A16 | 0 | 0 | −1.1717E−02 | 3.9556E−02 | −1.1907E−01 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |

| | S6 | S7 | S8 | S9 | S10 |
|---|---|---|---|---|---|
| K | 10.0000 | −0.8572 | −0.9987 | −0.9610 | −4.0942 |
| A3 | 0 | 0 | 0 | −1.69E−02 | 3.17E−02 |
| A4 | −2.8506E−02 | 4.0602E−02 | −2.7040E−02 | −2.31E−01 | −1.29E−01 |
| A5 | 0 | 0 | 0 | 6.47E−03 | 1.48E−02 |
| A6 | −8.6778E−02 | −1.0602E−01 | −9.8694E−03 | 6.29E−02 | 5.35E−02 |
| A7 | 0 | 0 | 0 | 3.07E−04 | −3.32E−02 |
| A8 | 1.7620E−01 | 6.7316E−02 | 5.4362E−03 | −1.07E−02 | 7.34E−03 |
| A9 | 0 | 0 | 0 | −2.20E−04 | −7.64E−04 |
| A10 | −1.6899E−01 | −2.9556E−02 | −2.8428E−03 | 1.25E−03 | 3.82E−05 |
| A11 | 0 | 0 | 0 | 5.24E−07 | 1.90E−04 |
| A12 | 1.1204E−01 | 6.5290E−03 | 6.4878E−04 | −8.38E−05 | −9.43E−05 |
| A13 | 0 | 0 | 0 | 2.19E−07 | 2.47E−06 |

TABLE 4-continued

| | | Example 2 | | | |
|---|---|---|---|---|---|
| A14 | −2.3876E−02 | −9.1220E−04 | −5.7276E−05 | 3.38E−06 | 4.96E−06 |
| A15 | 0 | 0 | 0 | −2.18E−08 | −5.37E−07 |
| A16 | −3.9473E−03 | 1.3159E−04 | 2.1217E−06 | −6.94E−08 | −3.04E−08 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |

FIG. 5 illustrates various aberrations in Numerical example 2 mentioned above. As apparent from the aberration diagrams, the distortion aberration is within the range of the above-described conditional expression (1), the other various aberrations are favorably corrected, and optimal optical performance is exerted.

Numerical Example 3

The imaging lens 3 illustrated in FIG. 6 is a lens system substantially configured of the first lens L1 to the fifth lens L5. The front-group lens system Gp1 is substantially configured of the first lens L1 to the third lens L3. The rear-group lens system Gp2 is configured of the fourth lens L4 and the fifth lens L5. The lens surface of the fifth lens L5 on the image side is concave on the image side near the optical axis, and convex on the image side around the periphery. The seal glass SG is disposed between the fifth lens L5 and the image forming surface IMG. The aperture stop is disposed in the vicinity of the front side of the first lens L1.

Table 5 shows lens data of Numerical example 3 to which specific numerical values are applied to the imaging lens 3, together with values of the focal length f of the entire lens system, the F number, and the full angle of view 2ω. In the imaging lens 3, both surfaces of each of the first lens L1 to the fifth lens L5 are aspherical. Table 6 shows values of the aspherical coefficients A3 to A20 of those aspherical surfaces, together with values of conic constant K.

TABLE 5

F = 2.07
f = 3.53
2ω = 76.0°
Example 3

| Lens Group | Si | Ri | Di | ni | vi |
|---|---|---|---|---|---|
| Gp1 | 0(STO) | ∞ | −0.212 | | |
| | 1(ASP) | 1.629 | 0.650 | 1.534 | 55.6 |
| | 2(ASP) | −7.642 | 0.020 | | |
| | 3(ASP) | 19.134 | 0.340 | 1.635 | 23.9 |
| | 4(ASP) | 2.227 | 0.384 | | |
| | 5(ASP) | 10.008 | 0.400 | 1.534 | 55.6 |
| | 6(ASP) | −126.498 | 0.431 | | |
| Gp2 | 7(ASP) | −60.893 | 0.790 | 1.534 | 55.6 |
| | 8(ASP) | −0.950 | 0.140 | | |
| | 9(ASP) | −3.677 | 0.400 | 1.534 | 55.6 |
| | 10(ASP) | 0.974 | 0.385 | | |
| SG | 11 | ∞ | 0.110 | 1.517 | 64.2 |
| | 12 | ∞ | 0.390 | | |
| IMG | 13 | ∞ | | | |

TABLE 6

| | | | Example 3 | | |
|---|---|---|---|---|---|
| | S1 | S2 | S3 | S4 | S5 |
| K | 0 | −10 | −2.8991 | −8.5685 | −7.2314 |
| A3 | 0 | 0 | −3.5370E−03 | 3.1653E−03 | 1.5714E−04 |
| A4 | 1.5849E−02 | 7.0374E−02 | 9.0027E−03 | 2.8643E−02 | −6.4173E−02 |
| A5 | 0 | 0 | −1.2498E−02 | 1.6382E−02 | −6.0121E−02 |
| A6 | −1.4502E−02 | −2.4449E−02 | 7.8503E−02 | 5.0353E−02 | 6.3786E−02 |
| A7 | 0 | 0 | 3.1259E−03 | 1.3981E−02 | −6.4536E−03 |
| A8 | 4.2777E−02 | −8.7094E−02 | −1.5439E−01 | −8.3866E−02 | −2.9234E−02 |
| A9 | 0 | 0 | −5.6386E−02 | −3.0217E−02 | −1.2663E−02 |
| A10 | −4.1199E−02 | −5.6022E−03 | 5.8834E−02 | 7.5479E−02 | 2.2628E−02 |
| A11 | 0 | 0 | 2.7122E−02 | 6.6378E−03 | 2.1636E−02 |
| A12 | −8.4563E−02 | 2.2519E−02 | 1.8896E−02 | 0 | 0 |
| A13 | 0 | 0 | 0 | 0 | 0 |
| A14 | 0 | 0 | 0 | 0 | 0 |
| A15 | 0 | 0 | 0 | 0 | 0 |
| A16 | 0 | 0 | 0 | 0 | 0 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | −10 | −2.8991 | −8.5685 | −7.2314 |
| | S6 | S7 | S8 | S9 | S10 |
| K | 8.4383 | −9.5486 | −5.6552 | −5.5934 | −6.3590 |
| A3 | 3.5831E−02 | −1.4109E−02 | −5.1854E−02 | −4.1054E−02 | −9.0854E−02 |
| A4 | −1.6296E−01 | 1.9564E−02 | −6.4078E−02 | −5.9365E−02 | −1.0835E−02 |
| A5 | 7.6234E−02 | −8.7918E−02 | 8.2750E−02 | 1.0556E−02 | 2.6099E−02 |
| A6 | −9.4044E−03 | 6.5409E−02 | 1.3239E−02 | 1.7985E−02 | −5.5353E−03 |
| A7 | −3.5710E−02 | 1.2689E−02 | −1.7105E−02 | 2.1956E−04 | −5.9039E−04 |
| A8 | −3.0963E−03 | −2.6775E−02 | −6.5723E−03 | −3.8891E−04 | −8.5084E−04 |

TABLE 6-continued

| | | | Example 3 | | |
|---|---|---|---|---|---|
| A9 | 5.0124E−03 | −1.9387E−02 | 1.0898E−03 | −2.9174E−04 | 4.0804E−05 |
| A10 | 5.4675E−03 | 4.1786E−03 | 8.5728E−04 | −2.0441E−04 | 6.8171E−05 |
| A11 | 1.8718E−03 | 5.7807E−03 | 9.5311E−04 | −1.6231E−05 | −6.9678E−06 |
| A12 | −1.1280E−03 | 4.6109E−04 | 2.8228E−05 | 4.9236E−06 | 1.5095E−06 |
| A13 | −1.0045E−02 | 0 | −2.3410E−04 | 2.7451E−06 | −7.4312E−07 |
| A14 | 1.3789E−02 | 0 | 0 | 1.8287E−06 | 4.2161E−07 |
| A15 | 1.9922E−02 | 0 | 0 | 0 | 1.9670E−07 |
| A16 | −1.4596E−02 | 0 | 0 | 0 | 2.3538E−07 |
| A17 | 0 | 0 | 0 | 0 | −1.1398E−07 |
| A18 | 0 | 0 | 0 | 0 | −2.0405E−08 |
| A19 | 0 | 0 | 0 | 0 | 4.2887E−10 |
| A20 | 0 | 0 | 0 | 0 | 4.2627E−09 |

FIG. 7 illustrates various aberrations in Numerical example 3 mentioned above. As apparent from the aberration diagrams, the distortion aberration is within the range of the above-described conditional expression (1), the other various aberrations are favorably corrected, and optimal optical performance is exerted.

Numerical Example 4

The imaging lens 4 illustrated in FIG. 8 is a lens system substantially configured of the first lens L1 to the fifth lens L5. The front-group lens system Gp1 is substantially configured of the first lens L1. The rear-group lens system Gp2 is configured of the second lens L2 to the fifth lens L5. The lens surface of the fifth lens L5 on the image side is concave on the image side near the optical axis, and convex on the image side around the periphery. The seal glass SG is disposed between the fifth lens L5 and the image forming surface IMG. The aperture stop is disposed in the vicinity of the front side of the first lens L1.

Table 7 shows lens data of Numerical example 4 to which specific numerical values are applied to the imaging lens 4, together with values of the focal length f of the entire lens system, the F number, and the full angle of view 2ω. In the imaging lens 4, both surfaces of each of the first lens L1 to the fifth lens L5 are aspherical. Table 8 shows values of the aspherical coefficients A3 to A20 of those aspherical surfaces, together with values of conic constant K.

TABLE 7

F = 1.96
f = 3.28
2ω = 77.0°
Example 4

| Lens Group | Si | Ri | Di | ni | vi |
|---|---|---|---|---|---|
| Gp1 | 0(STO) | ∞ | −0.149 | | |
| | 1(ASP) | 1.767 | 0.600 | 1.535 | 56.3 |
| | 2(ASP) | −4.496 | 0.030 | | |
| Gp2 | 3(ASP) | 5.438 | 0.340 | 1.635 | 23.9 |
| | 4(ASP) | 1.531 | 0.410 | | |
| | 5(ASP) | 4.666 | 0.570 | 1.535 | 56.3 |
| | 6(ASP) | −17.848 | 0.350 | | |
| | 7(ASP) | −0.756 | 0.340 | 1.550 | 36.0 |
| | 8(ASP) | −0.871 | 0.020 | | |
| | 9(ASP) | 1.220 | 0.600 | 1.535 | 56.3 |
| | 10(ASP) | 1.025 | 0.571 | | |
| SG | 11 | ∞ | 0.110 | 1.517 | 64.2 |
| | 12 | ∞ | 0.390 | | |
| IMG | 13 | ∞ | | | |

TABLE 8

| | Example 4 | | | | |
|---|---|---|---|---|---|
| | S1 | S2 | S3 | S4 | S5 |
| K | −1.330 | 9.993 | 5.193 | −8.405 | 10.000 |
| A3 | 0 | 0 | 1.3188E−03 | 2.9364E−02 | −5.5912E−02 |
| A4 | 8.3099E−03 | 9.7185E−02 | 3.3205E−02 | 1.0836E−01 | 9.5525E−02 |
| A5 | 0 | 0 | −5.7960E−02 | 8.5403E−02 | −2.7083E−01 |
| A6 | −4.9582E−02 | −2.2726E−01 | 6.2657E−02 | −1.5079E−01 | 1.4807E−01 |
| A7 | 0 | 0 | 3.0872E−02 | 6.9473E−02 | 1.0084E−01 |
| A8 | 1.4863E−02 | 1.2045E−01 | −2.2743E−01 | 2.6619E−03 | −6.3480E−02 |
| A9 | 0 | 0 | 3.9191E−02 | 3.7786E−02 | −1.1440E−01 |
| A10 | −7.2227E−02 | −5.8501E−02 | 2.4208E−01 | −2.3348E−02 | 8.7038E−03 |
| A11 | 0 | 0 | −7.7446E−02 | 0.0000E+00 | 5.2417E−02 |
| A12 | 0 | 1.2268E−02 | −2.4241E−02 | 0 | 0 |
| A13 | 0 | 0 | 0 | 0 | 0 |
| A14 | 0 | 0 | 0 | 0 | 0 |
| A15 | 0 | 0 | 0 | 0 | 0 |
| A16 | 0 | 0 | 0 | 0 | 0 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |
| | S6 | S7 | S8 | S9 | S10 |
| K | 8.810 | −0.702 | −4.063 | −0.654 | −5.859 |
| A3 | −9.9884E−03 | 1.3623E−01 | −2.8664E−01 | −3.5589E−01 | −3.5564E−03 |
| A4 | −1.5103E−01 | 8.7080E−02 | −9.4381E−02 | 6.0149E−02 | −1.1528E−01 |

TABLE 8-continued

| | | Example 4 | | | |
|---|---|---|---|---|---|
| A5 | 2.2389E−01 | −1.5454E−01 | 2.0211E−01 | 7.5188E−03 | 9.7644E−02 |
| A6 | −7.3877E−02 | 3.0729E−01 | 9.7003E−02 | 8.1378E−04 | −3.5722E−02 |
| A7 | −1.6079E−01 | 1.1437E−01 | −5.5577E−03 | −1.7920E−02 | 5.4397E−03 |
| A8 | 2.5632E−02 | −5.8115E−02 | −2.3860E−02 | −4.1868E−03 | −3.7654E−03 |
| A9 | 1.0761E−01 | −7.7784E−02 | 1.1787E−03 | 2.4939E−03 | 1.0686E−03 |
| A10 | 6.6789E−02 | −8.3167E−03 | −4.6523E−03 | 8.6370E−04 | 1.4258E−04 |
| A11 | −1.8704E−02 | 6.9774E−03 | −4.9519E−03 | 8.8406E−04 | −1.4837E−04 |
| A12 | −4.1219E−02 | 1.2104E−02 | −4.3538E−03 | 1.7634E−05 | 1.0163E−04 |
| A13 | −1.4758E−01 | 0 | 3.8825E−03 | 6.6527E−06 | −1.9734E−05 |
| A14 | 5.2541E−02 | 0 | 0 | −1.1932E−04 | −3.9344E−06 |
| A15 | 1.4754E−01 | 0 | 0 | 0 | 1.5372E−06 |
| A16 | −8.0404E−02 | 0 | 0 | 0 | 2.4300E−06 |
| A17 | 0 | 0 | 0 | 0 | −1.4365E−06 |
| A18 | 0 | 0 | 0 | 0 | −3.1072E−07 |
| A19 | 0 | 0 | 0 | 0 | −5.5870E−10 |
| A20 | 0 | 0 | 0 | 0 | 8.0269E−08 |

FIG. 9 illustrates various aberrations in Numerical example 4 mentioned above. As apparent from the aberration diagrams, the distortion aberration is within the range of the above-described conditional expression (1), the other various aberrations are favorably corrected, and optimal optical performance is exerted.

Numerical Example 5

The imaging lens 5 illustrated in FIG. 10 is a lens system substantially configured of the first lens L1 to the fourth lens L4. The front-group lens system Gp1 is substantially configured of the first lens L1 to the third lens L3. The rear-group lens system Gp2 is configured of the fourth lens L4. The lens surface of the fourth lens L4 on the image side is concave on the image side near the optical axis, and convex on the image side around the periphery. The seal glass SG is disposed between the fourth lens L4 and the image forming surface IMG. The aperture stop is disposed in the vicinity of the front side of the first lens L1.

Table 9 shows lens data of Numerical example 5 to which specific numerical values are applied to the imaging lens 5, together with values of the focal length f of the entire lens system, the F number, and the full angle of view 2ω. In the imaging lens 5, both surfaces of each of the first lens L1 to the fifth lens L5 are aspherical. Table 10 shows values of the aspherical coefficients A3 to A20 of those aspherical surfaces, together with values of conic constant K.

TABLE 9

F = 2.45
f = 3.64
2ω = 76.2°
Example 5

| Lens Group | Si | Ri | Di | ni | vi |
|---|---|---|---|---|---|
| Gp1 | 0(STO) | ∞ | −0.150 | | |
| | 1(ASP) | 1.423 | 0.668 | 1.535 | 56.3 |
| | 2(ASP) | −11.646 | 0.030 | | |
| | 3(ASP) | −2600 | 0.300 | 1.635 | 23.9 |
| | 4(ASP) | 3.081 | 0.651 | | |
| | 5(ASP) | −4.324 | 1.035 | 1.534 | 55.6 |
| | 6(ASP) | −1.019 | 0.100 | | |
| Gp2 | 7(ASP) | 8.144 | 0.430 | 1.535 | 56.3 |
| | 8(ASP) | 0.851 | 0.600 | | |
| SG | 9 | ∞ | 0.210 | 1.517 | 64.2 |
| | 10 | ∞ | 0.290 | | |
| IMG | 11 | ∞ | | | |

TABLE 10

| | | | Example 5 | | |
|---|---|---|---|---|---|
| | S1 | S2 | S3 | S4 | S5 |
| K | 0 | 0 | −10 | −5 | −10 |
| A3 | 0 | 0 | 0 | 0 | 0 |
| A4 | −8.2758E−03 | −1.4608E−02 | 4.7912E−02 | 1.2970E−01 | −3.4989E−02 |
| A5 | 0 | 0 | 0 | 0 | 0 |
| A6 | −4.7929E−02 | −3.5131E−01 | −3.7644E−01 | −1.3040E−01 | −2.6997E−01 |
| A7 | 0 | 0 | 0 | 0 | 0 |
| A8 | 1.0779E−01 | 4.6933E−01 | 5.6709E−01 | 2.5240E−01 | 3.3778E−01 |
| A9 | 0 | 0 | 0 | 0 | 0 |
| A10 | −2.0598E−01 | −3.5396E−01 | −3.1084E−01 | −5.5415E−02 | −2.1740E−01 |
| A11 | 0 | 0 | 0 | 0 | 0 |
| A12 | 0 | 0 | 0 | 0 | 0 |
| A13 | 0 | 0 | 0 | 0 | 0 |
| A14 | 0 | 0 | 0 | 0 | 0 |
| A15 | 0 | 0 | 0 | 0 | 0 |
| A16 | 0 | 0 | 0 | 0 | 0 |
| A17 | 0 | 0 | 0 | 0 | 0 |
| A18 | 0 | 0 | 0 | 0 | 0 |
| A19 | 0 | 0 | 0 | 0 | 0 |
| A20 | 0 | 0 | 0 | 0 | 0 |

TABLE 10-continued

| | Example 5 | | |
|---|---|---|---|
| | S6 | S7 | S8 |
| K | −3.4273 | −0.9058 | −3.8774 |
| A3 | 0 | −1.2171E−01 | −1.3807E−01 |
| A4 | −1.5399E−01 | −2.9753E−01 | −2.9291E−01 |
| A5 | 0 | −4.0073E−01 | 4.5909E−01 |
| A6 | 5.4303E−02 | 1.2665E+00 | −2.4415E−01 |
| A7 | 0 | −1.0149E+00 | 4.0003E−02 |
| A8 | −4.6681E−03 | 3.7593E−01 | 8.5755E−03 |
| A9 | 0 | −6.6776E−02 | −3.5138E−03 |
| A10 | 8.7754E−04 | 4.5278E−03 | 2.8408E−04 |
| A11 | 0 | 0 | 0 |
| A12 | 0 | 0 | 0 |
| A13 | 0 | 0 | 0 |
| A14 | 0 | 0 | 0 |
| A15 | 0 | 0 | 0 |
| A16 | 0 | 0 | 0 |
| A17 | 0 | 0 | 0 |
| A18 | 0 | 0 | 0 |
| A19 | 0 | 0 | 0 |
| A20 | 0 | 0 | 0 |

FIG. 11 illustrates various aberrations in Numerical example 5 mentioned above. As apparent from the aberration diagrams, the distortion aberration is within the range of the above-described conditional expression (1), the other various aberrations are favorably corrected, and optimal optical performance is exerted.

Other Numerical Data of Respective Examples

Table 11 is a summary of values related to the above-described conditional expressions for the respective numerical examples. As can be seen from Table 11, the values related to the conditional expressions in the respective numerical examples 2, 3, and 5 are within the numerical ranges thereof. In Numerical example 1, the values related to the conditional expressions are within the numerical range thereof except for the conditional expression (5). In Numerical example 4, the values related to the conditional expressions are within the numerical range thereof except for the conditional expressions (4) and (5).

TABLE 11

| Conditional Expression | Example 1 | Example 2 | Example 3 | Example 4 | Example 5 |
|---|---|---|---|---|---|
| (1) 5 < ODmax < 20 | 11 | 19 | 7 | 7 | 6 |
| (2) 0.55 < L inf/D < 0.80 | 0.636 | 0.582 | 0.749 | 0.770 | 0.721 |
| (3) fra < 0 | −7.314 | −5.113 | −3.754 | −8.942 | −3.376 |
| (4) frb < 0 | −20.363 | −22.806 | −37.520 | 90.486 | −20.375 |
| (5) frc < 0 | 84.941 | −36.906 | −1.399 | 168.923 | −1.816 |

4. Other Embodiments

The technology of the disclosure is not limited to the above description of the embodiments and the examples, and may be variously modified.

For example, the shapes of the respective sections and the numerical values in the respective numerical examples mentioned above are merely specific examples to embody the technology and the technical scope of the technology should not be limitedly construed based thereon.

Further, in the embodiments and the examples mentioned above, the configuration substantially configured of the two lens groups has been described. Alternatively, a configuration further including a lens that has substantially no refractive power may be employed.

In addition, for example, the technology may be configured as follows.

[1] An imaging device including:
an imaging lens;
an imaging element that converts an optical image formed on an image forming surface by the imaging lens, into an electric signal; and
a computing device that corrects distortion aberration of an image picked up by the imaging element,
wherein the imaging lens includes, in order from object side,
a front-group lens system having positive refractive power, and
a rear-group lens system having negative refractive power, a lens surface on a closest side to the image of the rear-group lens system being concave on an image side near an optical axis and convex on the image side around a periphery, and
the following conditional expression is satisfied:

$$5(\%) < OD_{Max} < 20(\%) \qquad (1)$$

where $OD_{Max}$ is a maximum value of distortion aberration within an imaging region of the imaging lens.

[2] The imaging device according to [1], wherein the imaging lens satisfies the following condition:

$$0.55 < L_{inf}/D < 0.80 \qquad (2)$$

where $L_{inf}$ is a distance on the optical axis between a lens surface on a closest side to the object and the image forming surface when the imaging lens is focused on infinity (where a distance between the lens surface on the closest side to the image in the rear-group lens system and the image forming surface is an air conversion length), and D is a diagonal length of an effective imaging region.

[3] The imaging device according to [1] or [2], wherein
each of the front-group lens system and the rear-group lens system includes one or a plurality of lenses, and
an entire lens system including the front-group lens system and the rear-group lens system includes, in order from the object side, a first lens having positive refractive power and a second lens having negative refractive power.

[4] The imaging device according to any one of [1] to [3], wherein
each of the front-group lens system and the rear-group lens system includes one or a plurality of lenses, and
the imaging lens satisfies the following conditional expression:

$$f_{ra}<0 \quad (3)$$

where $f_{ra}$ is a synthetic focal length of all of second and following lenses in an entire lens system including the front-group lens system and the rear-group lens system.

[5] The imaging device according to any one of [1] to [4], wherein
each of the front-group lens system and the rear-group lens system includes one or a plurality of lenses, and
the imaging lens satisfies the following conditional expression:

$$f_{rb}<0 \quad (4)$$

where $f_{rb}$ is a synthetic focal length of two lenses from the image side in an entire lens system including the front-group lens system and the rear-group lens system.

[6] The imaging device according to any one of [1] to [5], wherein
each of the front-group lens system and the rear-group lens system includes one or a plurality of lenses, and
the imaging lens satisfies the following conditional expression:

$$f_{rc}<0 \quad (5)$$

where $f_{rc}$ is a focal length of a lens on the closest side to the image in an entire lens system including the front-group lens system and the rear-group lens system.

[7] The imaging device according to any one of [1] to [6], wherein an entire lens system including the front-group lens system and the rear-group lens system includes at least four lenses.

[8] The imaging device according to any one of [1] to [7], wherein the imaging lens further includes a lens having substantially no refractive power.

[9] An imaging lens including: in order from object side,
a front-group lens system having positive refractive power; and
a rear-group lens system having negative refractive power, a lens surface on a closest side to the image of the rear-group lens system being concave on an image side near an optical axis and convex on the image side around a periphery,
wherein the following conditional expression is satisfied:

$$5(\%)<OD_{Max}<20(\%) \quad (1)$$

where $OD_{Max}$ is a maximum value of distortion aberration within an imaging region of the imaging lens.

[10] The imaging lens according to [9], wherein the following condition is satisfied:

$$0.55<L_{inf}/D<0.80 \quad (2)$$

where $L_{inf}$ is a distance on the optical axis between a lens surface on a closest side to the object and an image forming surface when the imaging lens is focused on infinity (where a distance between the lens surface on the closest side to the image in the rear-group lens system and the image forming surface is an air conversion length), and
D is a diagonal length of an effective imaging region.

[11] The imaging lens according to [9] or [10], wherein
each of the front-group lens system and the rear-group lens system includes one or a plurality of lenses, and
an entire lens system including the front-group lens system and the rear-group lens system includes, in order from the object side, a first lens having positive refractive power and a second lens having negative refractive power.

[12] The imaging lens according to any one of [9] to [11], wherein
each of the front-group lens system and the rear-group lens system includes one or a plurality of lenses, and
the following conditional expression is satisfied:

$$f_{ra}<0 \quad (3)$$

where $f_{ra}$ is a synthetic focal length of all of second and following lenses in an entire lens system including the front-group lens system and the rear-group lens system.

[13] The imaging lens according to any one of [9] to [12], wherein
each of the front-group lens system and the rear-group lens system includes one or a plurality of lenses, and
the following conditional expression is satisfied:

$$f_{rb}<0 \quad (4)$$

where $f_{rb}$ is a synthetic focal length of two lenses from the image side in an entire lens system including the front-group lens system and the rear-group lens system.

[14] The imaging lens according to any one of [9] to [13], wherein
each of the front-group lens system and the rear-group lens system includes one or a plurality of lenses, and
the following conditional expression is satisfied:

$$f_{rc}<0 \quad (5)$$

where $f_{rc}$ is a focal length of a lens on the closest side to the image in an entire lens system including the front-group lens system and the rear-group lens system.

[15] The imaging lens according to any one of [9] to [14], wherein an entire lens system including the front-group lens system and the rear-group lens system includes at least four lenses.

[16] The imaging lens according to any one of [9] to [15], wherein the imaging lens is used in an imaging device provided with a computing device that corrects distortion aberration of an image picked up by an imaging element.

[17] The imaging lens according to any one of [9] to [16], further including a lens having substantially no refractive power.

This application is based upon and claims the benefit of priority of the Japanese Patent Application No. 2013-268398 filed in the Japan Patent Office on Dec. 26, 2013, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. An imaging device, comprising:
an imaging lens that includes a first lens, a second lens, a third lens, a fourth lens, and a fifth lens in this order from an object side, wherein the first lens includes an object side surface that is on a closest side to an object, the object side indicates a side that corresponds to the object, the third lens includes a first lens surface on an image side, the fourth lens includes a second lens surface on the object side and a third lens surface on the image side, the fifth lens includes a fourth lens surface on the object side, a distance between the first lens surface and the second lens surface is greater than a distance between the third lens surface and the fourth lens surface, and a value of a paraxial curvature radius of each of the second lens surface and the third lens surface is positive;

an imaging element configured to:

pickup an optical image from an image forming surface of the imaging lens; and convert the optical image into an electric signal; and a computing device configured to correct distortion aberration of the optical image, wherein the imaging lens further includes, in order from the object side, a front-group lens system having positive refractive power and a rear-group lens system, the front-group lens system includes the first lens, the rear-group lens system includes, on a closest side to the image forming surface, the fifth lens, the fifth lens further includes a fifth lens surface on the image side, the fifth lens surface is concave near an optical axis and convex around a periphery, and the imaging lens satisfies the following conditional expressions:

$$5(\%) < OD_{Max} < 20(\%) \tag{1}$$

$$0.55 < Linf/D\ 0.582\ldots \tag{2}$$

$$f_{ra} < 0 \tag{3}$$

$$f_{rb} < 0 \tag{4}$$

where $OD_{Max}$ is a maximum value of the distortion aberration within an imaging region of the imaging lens, Linf is a distance from the object side surface to the image forming surface when the imaging lens is focused on infinity, $f_{ra}$ is a synthetic focal length of the second lens, the third lens, the fourth lens, and the fifth lens, $f_{rb}$ is a synthetic focal length of the fourth lens and the fifth lens, the distance is on the optical axis, and D is a diagonal length of the image forming surface.

2. The imaging device according to claim 1, wherein the first lens has the positive refractive power and the second lens has negative refractive power.

3. The imaging device according to claim 1, wherein the front-group lens system further includes the second lens, the third lens, and the fourth lens.

4. An imaging lens, comprising: in order from an object side a front-group lens system having positive refractive power; and a rear-group lens system, wherein the object side indicates a side that corresponds to an object, the imaging lens includes a first lens, a second lens, a third lens, a fourth lens, and a fifth lens in this order from the object side, the first lens includes an object side surface that is on a closest side to the object, the third lens includes a first lens surface on an image side, the fourth lens includes a second lens surface on the object side and a third lens surface on the image side, the fifth lens includes a fourth lens surface on the object side, a distance between the first lens surface and the second lens surface is greater than a distance between the third lens surface and the fourth lens surface, a value of a paraxial curvature radius of each of the second lens surface and the third lens surface is positive, the front-group lens system includes the first lens, the rear-group lens system includes, on a closest side to an image forming surface, the fifth lens, the fifth lens further includes a fifth lens surface on the image side, the fifth lens surface is concave near an optical axis and convex around a periphery, the imaging lens satisfies the following conditional expressions:

$$5(\%) < OD_{Max} < 20(\%) \tag{1}$$

$$0.55 < Linf/D\ 0.582\ldots \tag{2}$$

$$f_{ra} < 0 \tag{3}$$

$$f_{rb} < 0 \tag{4}$$

where $OD_{Max}$ is a maximum value of a distortion aberration within an imaging region of the imaging lens, Linf is a distance from the object side surface to the image forming surface when the imaging lens is focused on infinity, $f_{ra}$ is a synthetic focal length of the second lens, the third lens, the fourth lens, and the fifth lens, $f_{rb}$ is a synthetic focal length of the fourth lens and the fifth lens, the distance is on the optical axis, and D is a diagonal length of the image forming surface.

5. The imaging lens according to claim 4, wherein the first lens has the positive refractive power and the second lens has negative refractive power.

* * * * *